United States Patent Office 3,752,781
Patented Aug. 14, 1973

3,752,781
POLYALKYLENIMINE-UREA-ALDEHYDE CATIONIC RESINS
Thaddeus M. Muzyczko, Melrose Park, and David L. York, Elgin, Ill., assignors to The Richardson Company, Melrose Park, Ill.
No Drawing. Filed Sept. 2, 1970, Ser. No. 69,146
Int. Cl. C09d 5/02; C08g 51/24
U.S. Cl. 260—29.4 R
16 Claims

ABSTRACT OF THE DISCLOSURE

A process for preparing novel water soluble polyalkylenimine-urea aldehyde resins with numerous branched tertiary amino groups which provide versatile polymers having increased stability, solubility and greater compatibility with anionic polymers. Their miscibility can be modified for greater solubility in organic solvents by reacting other aromatic nitrogen containing compounds therewith.

BACKGROUND OF THE INVENTION

This invention relates to a series of novel amine-urea-aldehyde resins and processes for their manufacture. More particularly, it has been discovered that certain derivatives of polyalkylenimine-urea-aldehyde with branched tertiary amine groups provide polymers with unusual and favorable properties.

The tertiary amine cationic resins of the present invention possess greatly improved storage stability and particularly in their uncured solution form. In addition, the novel resins disclosed have a wide solubility range and are readily soluble in water. Thus, amino resins have been developed with a high degree of compatibility with other water soluble polymers and do not precipitate in the presence of anionic polymers or anionic surfactants. Furthermore, because of the highly stable character of these resins, special storage requirements are unnecessary to assure a prolonged shelf life, the latter of which has been considerably extended over related polymers. Advantageously, the resins of the present invention can be prepared, stored and shipped as highly concentrated solutions with low viscosities, thereby lowering costs for shipping.

The polyalkylenimine-urea-aldehyde resins with their greatly improved properties of better stability and compatibility are quite versatile and can be employed for a wide range of uses. For example, they are useful in paper products for increasing wet strength and may be employed in the treatment of textiles or as coatings for cellulosic cloths to provide ion exchange filter media. The present resins may also serve as polymer intermediates for example, in sulfomethylating or aminomethylating reactions. They also have been found to be specially beneficial as anchor coats for lithographic plates, rendering them more receptive for subsequent hydrophilic coats. In addition to the substantive nature of these polymers they may be cured with acid catalysts.

In many instances, it has been desirable to employ various melamine and urea formaldehyde derivatives as paper coating resins, textile coating resins, and the like. However, such amino resins have more limited solubility ranges, react adversely in the presence of anionic materials and have a rather limited shelf life, and therefore, have not been fully acceptable in many cases. Frequently, with earlier products special precautions had to be taken for storage, requiring expensive handling, refrigeration and elaborate facilities to prevent contamination, adverse temperature changes and viscosity variations. Products, heretofore, have experienced problems with self-polymerization during storage, adversely affecting the fluidity and performance of the product.

Accordingly, it is a principal object of this invention to provide a series of novel, highly stable polyalkylenimine-urea-aldehyde resins.

Another principal object of the present invention is to provide a convenient single vessel process for preparing the above mentioned cationic resins.

It is another object to provide a series of amino resins having an improved solubility range and extended shelf life.

It is a further object to provide a resin with improved compatibility with anionic materials.

A still further object is to provide amino resins which do not self-polymerize in solution and that can be prepared in high concentrations having usably low viscosities.

SUMMARY OF THE INVENTION

Briefly, the process of making polyalkylenimine-urea-aldehyde resins of the present invention comprises first reacting a solution of a urea having approximately equal amounts of water and the urea with a polyalkylenimine, which under heat, reflux and distillation forms a polyurea. However, this reaction is allowed to proceed only to the point where about 10–30% of the available primary and secondary amine sites of the polyalkylenimine react with the urea to form the polyurea. Controlled substitution at the primary and secondary nitrogen sites is accomplished by stripping off ammonia and water. During this stage, additional water may be added and distillation continued at a temperature of about 135 to 155° F. under vacuum until 80–95% solids is obtained. Atmospheric distillation is also possible. At a temperature of about 120° to 160° F. a second batch of the urea is added to the reaction mass, then cooled to about 100° to 130° F. An aldehyde is then incorporated into this medium viscosity polyurea for methylolation. With continuous heat and reflux a clear, low viscosity methylolated polyurea-imine type product having branched tertiary amino groups is formed, which is diluted with water to 20% to 40% solids. Acceptable products may be prepared with solid contents of up to 60–70%. Finally, the pH is adjusted to about neutral or in a range from 7 to 8.5 with acid.

As previously indicated, the novel resins of the present invention may be prepared in a single reaction vessel. The initial step of the process requires reacting an aqueous solution of a urea with a polyalkylenimine to form a polyurea. The polyalkylenimines used herein are well known products of commerce and may be represented by the general formula:

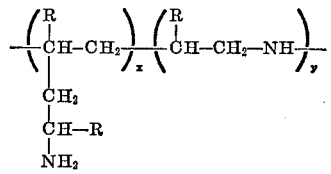

where R is hydrogen or lower alkyl. $x$ is branched tertiary alkylenimine and $y$ is secondary alkylenimine.

The above polyalkylenimines found particularly suitable as starting reactants for the instant process are water soluble, cationic polyelectrolytes having in addition to secondary nitrogens, both primary and tertiary nitrogens. However, the most favorable ratio of primary to secondary to tertiary nitrogens is approximately 1:2:1. The imine resins should have for the purposes of the instant invention a molecular weight of from 500 to 20,000, but preferably in the range of 600 to 2,000 and most advantageously a molecular weight of about 1,200.

The process for preparing polyalkylenimine resins is well known and documented in the literature. One process involves polymerizing a secondary amine such as alkylenimine having the formula:

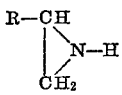

where R is hydrogen or lower alkyl. When this material is placed in an aqueous medium in the presence of an acid catalyst ring opening homopolymerization occurs. Although there are processes for making more linear, less branched polyalkylenimine polymers, only those processes that yield branched structures are deemed of importance to the instant invention.

Examples of specific alkylenimines which may be used in preparing corresponding polymer starting materials are propylenimine, butylenimine, pentylenimine, and particlarly ethylenimine, which is preferred.

Thus, it has been found that various polyalkylenimine resin materials like polyethylenimine, polypropylenimine and the like may be advantageously reacted with a urea, including in addition to urea, mono-substituted lower alkyl ureas such as methyl, ethyl, and propyl. The aqueous urea solution of the present invention may be premixed prior to charging the reaction vessel or alternatively mixed in the reactor to make a solution of about 1:1 urea and water. The amount of the urea added to the reaction vessel should be in the range of from 0.1 to 1.5 moles and more preferably 0.8 to 1.2 moles per 1 primary and secondary amine equivalent site on the polyalkylenimine.

The reaction mass is heated to about 170° to 200° F. under reflux to form 10–30% polyurea, however, about 10% polyurea is preferred. Under vacuum the mass is stripped to 80 to 95% solids and ammonia and water are distilled off. Additional water may be required to bring the mixture to 65–70% solids as determined by moisture balance. Distillation of ammonia-water is continued until a clear polyurea is formed having a medium viscosity of from about 1000–2000 cps. at 120° F. and a pH of 8.5 to 10.5.

To the polyurea, a second batch of urea is added while maintaining a temperature of about 120 to 160° F. The amount of additional urea added may range from about 0.2 to 1.3 moles and more advantageously from 0.9 to 1.1 moles per 1 primary and secondary amine equivalent site on the polyalkylenimine.

After adding additional urea to the mixture, it is permitted to cool to a range of from 100 to 130° F. The reaction mass is then ready for methylolation by slowly adding thereto a methylolating amount of a solution of an aldehyde to form a methylolated polyurea amine. Formaldehyde solutions such as formalin are preferred, however, solutions of acetaldehyde may also be used in this step of the process. It has been found that about 0.6 to 1.8 moles and preferably from 1 to 1.2 moles of aldehyde per 1 primary and secondary amine equivalent site on the polyalkylenimine should be used. During this stage it is also beneficial to agitate the mixture to assure a smooth, homogeneous mass, since the addition of an aldehyde has a tendency to cause lumping or agglomeration. The reaction mass is then refluxed at a temperature range of from 170 to 200° F. until free aldehyde in the mixture reaches a value of less than 1.5% and total solids for the mixture range from about 50 to 65%. The reaction mass containing the polyalkylenimine-urea-aldehyde resin is diluted with water to about 20–40% solids and the pH is adjusted to a neutral range of about 7 to 8.5 with an acid. Those acids found most suitable for use in the present invention are formic, citric and acetic, however, essentially any organic acid may be effectively used for adjusting the pH.

The resulting product is a highly stable, water soluble polyalkylenimine-urea-aldehyde amine resin having numerous branched tertiary amine groups which impart greater compatibility, especially with oppositely charged polymeric materials.

It has also been discovered that the solubility of the polyalkylenimine resins of the present invention can be easily modified so as to make them more oleophilic and miscible with organic solvents, and at the same time retain their desirable features as previously indicated. The more oleophilic form of the above resins can be manufactured preferably without additional process steps. These more lipophilic resins can be prepared by incorporating into the reaction mass with the second batch of urea a sufficient amount of a triazine material selected from the group consisting of melamine and benzoguanamine. However, the addition of the triazine material along with the second batch of urea is optional, and can also be added after the basic polyalkylenimine resin has been made.

Another nitrogen containing material dodecylaminopropylamine has also been reacted in a manner like the above mentioned triazines to provide a more lipophilic product. These additional reactants are most effectively employed in the range of from 0.5% to 5.0% by weight based upon the weight of the polyalkylenimine-urea-aldehyde resin. Additional aldehyde may be added in the range of from 1% to 10% for purposes of co-reacting with this nitrogen containing material.

The following examples illustrate some of the embodiments of this invention. It is to be understood that these are for illustrative purposes only and do not purport to be wholly definitive as to conditions and scope.

EXAMPLE I

To a single reaction vessel, 658 pounds of polyethylenimine having a molecular weight of 1200 is added, which is preheated to 110 to 130° F. to lower its viscosity. Stirring is provided by a motor-driven anchor agitator.

The reaction vessel is then charged with a premixed solution of water and 790 pounds of urea (1:1 ratio by weight) and heated to 140° F. The entire mass is then mixed and heated to 185° F. and refluxed for one hour. During this process, vacuum is applied (20–26 in Hg) and the mixture stripped to 90% solids. Additional water is then added to bring the mixture to 70% solids. Ammonia and water continues to distill off.

The reaction mass attains a pH of about 9.6 and is a clear, medium viscosity polyurea. The temperature is maintained at 140° F. and a second batch of urea (830 pounds) is added to the vessel, which is then cooled to 115° F.

Slowly with agitation, 2,950 pounds of Formalin (37% formaldehyde) is incorporated into the polyurea which is then refluxed for 4 hours until the remaining formaldehyde is less than 1.5%. The resinous mixture is cooled below 100° F. and diluted to 30% solids with water. The pH is adjusted to about 8 using formic acid, and filtered.

The resulting clear, dark red-brown resin is analyzed and should have a solids content of 30%, specific gravity 1.099, and a viscosity of 6–10 cps. at 25° C.

EXAMPLE II

A 500 ml. reaction flask was charged with 200 grams of the resin described in Example I. Ten grams of Formalin and one gram of melamine was added and this slurry refluxed for 30 minutes at a pH of 8.0. All of the melamine was methylolated as evidenced by a clear solution.

EXAMPLE III

A 2-liter resin kettle fitted with a thermometer, stirrer, and condenser was charged with 1000 grams of the product of Example I and 60 grams of Formalin solution with 3 grams of a solution available under the Trademark "Duomeen CD" which is essentially dodecylaminopropylamine and 30 grams of water neutralized with acetic acid.

The mixture was heated to 80° C. for 1 hour with stirring, and then allowed to cool. Solids present after filtration were 30%. The solution was clear dark-brown, and had a viscosity comparable to that of water.

EXAMPLE IV

A one-liter resin kettle equipped with a thermometer, condenser, and stirrer was charged with 300 grams of the product of Example I along with 18 grams of Formalin solution having 1.8 grams of benzoguanamine suspended in it. The mixture was heated to 95° C. and refluxed for 2 hours. Solids were only 30%. The final solution was clear, dark-brown having a viscosity slightly higher than water.

While the invention has been described in conjunction with specific examples thereof, this is illustrative only. According, many alternatives, modifications and variations will be apparent to those skilled in the art in light of the foregoing description, and it is therefore intended to embrace all such alternatives, modifications and variations as to fall within the spirit and broad scope of the appended claims.

What is claimed is:

1. A process for preparing tertiary amine cationic resins, which process comprises:
   (a) charging a reaction vessel with a polyalkylenimine resin selected from the group consisting of polyethylenimine polypropylenimine, polybutylenimine, and polypentylenimine, and adding thereto water and a urea to form a reaction mass, the molecular structure of said polyalkylenimine resin including a polyamine portion having primary amine-terminated branches originating from tertiary amine groups in the polyamine portion thereof, said polyalkylenimine resin having a molecular weight of from 500–20,000, said urea being added in an amount to provide from 0.1 to 1.5 moles urea per primary and secondary amine equivalent on the polyalkylenimine resin;
   (b) heating the reaction mass under reflux at about 170–200° F. for a period of time sufficient to form 10–30% polyurea while ammonia and some water are removed;
   (c) adding to the polyurea mixture produced in step (b) additional amounts of a urea of from about 0.2 to 1.3 moles urea per primary and secondary amine equivalent on the polyalkylenimine resin, said adding taking place at a temperature of about 120–160° F., cooling the resulting mixture to a temperature in the range of from 100–130° F.;
   (d) subjecting the resulting polyurea-urea mixture to methylolation by adding thereto 0.6 to 1.8 moles of aldehyde per each primary and secondary amine equivalent site in the polyalkylenimine used, to form said tertiary amine cationic resin having branched tertiary amino groups; and,
   (e) adjusting the pH of the resin to about a neutral range.

2. The process of claim 1 wherein the polyalkylenimine is polyethylenimine.

3. The process of claim 1 wherein urea is reacted with the polyalkylenimine.

4. The process of claim 1 where the reaction mass comprising a polyalkylenimine, water and urea is heated to form 10% polyurea.

5. The process of claim 1 wherein the methylolating agent is a material selected from the group consisting of formaldehyde, formalin and acetaldehyde.

6. The process of claim 1 wherein the pH of the polyalkylenimine-urea-aldehyde resin is adjusted to about 7 to 8.5 by means of an acid selected from the group consisting of formic acid, acetic acid and citric acid.

7. A process for preparing lipophilic tertiary amine cationic resin product which process comprises:
   (a) charging a reaction vessel with a polyalkylenimine resin selected from the group consisting of polyethylenimine and polypropylenimine, and adding thereto water and a urea to form a reaction mass, the molecular structure of said polyalkylenimine resin including a polyamine portion having primary amine-terminated branches originating from tertiary amine groups in the polyamine portion thereof, said polyalkylenimine resin having a molecular weight of from 500–20,000, said urea being added in an amount to provide from 0.1 to 1.5 moles urea per primary and secondary amine equivalent on the polyalkylenimine resin;
   (b) heating the reaction mass under reflux at about 170–200° F. for a period of time sufficient to form 10–30% polyurea while ammonia and some water are removed;
   (c) adding to the polyurea mixture produced in step (b) additional urea in an amount from about 0.2 to 1.3 moles urea per primary and secondary amine equivalent on the polyalkylenimine resin, and adding nitrogen-containing material selected from the group consisting of melamine, benzoguanamine, and duodecylaminopropylamine, said nitrogen containing material being added in an amount of from 0.5 to 5% by weight based on the weight of the cationic resin product, said adding taking place at a temperature of about 120–160° F., cooling the resulting mixture to a temperature in the range of from 100–130° F.;
   (d) subjecting the resulting polyurea-urea mixture to methylolation by adding thereto 0.6 to 1.8 moles of aldehyde per each primary and secondary amine equivalent in the polyalkylenimine used, to form said tertiary amine cationic resin product having branched tertiary amino groups; and
   (e) adjusting the pH of the resin to about a neutral range.

8. The process of claim 7 wherein the nitrogen containing material selected from the group consisting of melamine, benzoguamine and dodecylaminopropylamine is added to the reaction mass after methylolation.

9. The product obtained according to the process of claim 1.

10. The product obtained according to the process of claim 2.

11. The product obtained according to the process of claim 3.

12. The product obtained according to the process of claim 4.

13. The product obtained according to the process of claim 5.

14. The product obtained according to the process of claim 6.

15. The product obtained according to the process of claim 7.

16. The product obtained according to the process of claim 8.

References Cited

UNITED STATES PATENTS

| 3,006,896 | 10/1961 | Horst et al. | 260—70 R |
| 3,496,121 | 2/1970 | Shen | 260—2 EN |
| 2,145,242 | 1/1939 | Arnold | 260—70 AX |
| 2,683,134 | 7/1954 | Davidson et al. | 260—70 |
| 2,786,824 | 3/1957 | Keim | 260—70 |
| 2,816,092 | 12/1957 | Kelly | 260—71 |
| 3,275,605 | 9/1966 | Eastes et al. | 260—70 |
| 2,834,756 | 5/1958 | Suen et al. | 260—72 |

FOREIGN PATENTS

| 467,505 | 8/1950 | Canada. |

JOAN B. EVANS, Primary Examiner

U.S. Cl. X.R.

260—29.4 UA, 69, 70, 71, 72

UNITED STATES PATENT OFFICE
CERTIFICATE OF CORRECTION

Patent No. 3,752,781          Dated August 14, 1973

Inventor(s) Thaddeus M. Muzyczko et al.

It is certified that error appears in the above-identified patent and that said Letters Patent are hereby corrected as shown below:

Column 2, lines 50 to 60, the formula should appear as shown below:

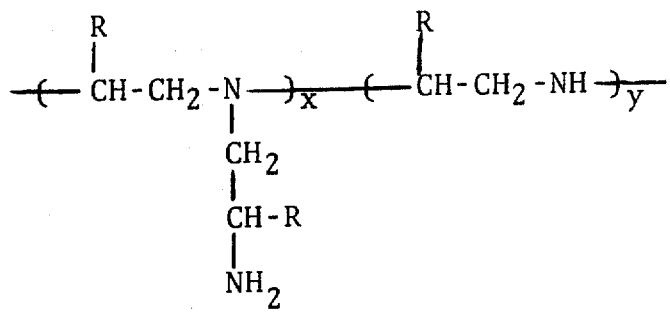

Signed and sealed this 20th day of August 1974.

(SEAL)
Attest:

McCOY M. GIBSON, JR.          C. MARSHALL DANN
Attesting Officer              Commissioner of Patents